(12) United States Patent
Yamazaki et al.

(10) Patent No.: US 11,838,617 B2
(45) Date of Patent: Dec. 5, 2023

(54) IMAGE FORMING APPARATUS STORING SCAN DATA IN EXTERNAL MEMORY NON-TRANSITORY RECORDING MEDIUM STORING CONTROL PROGRAM, AND CONTROL METHOD

(71) Applicant: CANON KABUSHIKI KAISHA, Tokyo (JP)

(72) Inventors: Toshinori Yamazaki, Tokyo (JP); Hyochoru Tanaka, Tochigi (JP); Shu Ito, Tochigi (JP); Toshihiro Okuda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/490,744

(22) Filed: Sep. 30, 2021

(65) Prior Publication Data
US 2022/0116538 A1 Apr. 14, 2022

(30) Foreign Application Priority Data

Oct. 9, 2020 (JP) .................................. 2020-170990

(51) Int. Cl.
*H04N 5/232* (2006.01)
*G03B 5/02* (2021.01)
(Continued)

(52) U.S. Cl.
CPC ............ *H04N 23/617* (2023.01); *G03B 5/02* (2013.01); *H04N 23/55* (2023.01); *H04N 23/81* (2023.01);
(Continued)

(58) Field of Classification Search
CPC ......... H04N 5/21–2178; H04N 5/2253; H04N 5/2254; H04N 5/23209; H04N 5/23216; H04N 5/23218; H04N 5/23219; H04N 5/23222; H04N 5/2328–23287; H04N 5/23296; H04N 5/3572–35721; H04N 5/23225; H04N 23/617; G03B 2205/00–0046; G02B 27/0025–0043;
(Continued)

(56) References Cited

U.S. PATENT DOCUMENTS

2020/0213581 A1\* 7/2020 Lu .............................. G06T 7/70
2020/0351440 A1\* 11/2020 Seta ...................... H04N 23/617
(Continued)

FOREIGN PATENT DOCUMENTS

JP H06110115 A 4/1994
JP 2008170981 A 7/2008
(Continued)

*Primary Examiner* — Paul M Berardesca
(74) *Attorney, Agent, or Firm* — CANON U.S.A., INC. IP Division (57) ABSTRACT

An apparatus including: a system including a correction lens unit configured to move to correct an aberration; a driving device configured to move the correction lens unit; an image pickup element configured to pick up an image formed by the system; an obtaining device configured to obtain an aberration based on a picked up image, through use of a learned model obtained by learning an image and aberration data of the system; and a controller configured to control the driving device based on the aberration, to thereby correct the aberration.

20 Claims, 4 Drawing Sheets

(51) Int. Cl.
*H04N 5/217* (2011.01)
*H04N 5/225* (2006.01)
*H04N 23/617* (2023.01)
*H04N 23/55* (2023.01)
*H04N 23/81* (2023.01)
*G02B 27/00* (2006.01)
*G02B 27/64* (2006.01)
*G03B 17/14* (2021.01)

(52) U.S. Cl.
CPC ...... *G03B 17/14* (2013.01); *G03B 2205/0023* (2013.01); *G03B 2205/0069* (2013.01)

(58) Field of Classification Search
CPC ... G02B 27/0068; G02B 27/64; G02B 27/646
See application file for complete search history.

(56) References Cited

U.S. PATENT DOCUMENTS

| | | | |
|---|---|---|---|
| 2021/0084238 A1* | 3/2021 | Kashiwagi | H04N 23/617 |
| 2021/0127059 A1* | 4/2021 | Powell | H04N 5/247 |
| 2021/0239971 A1* | 8/2021 | Georgiou | G02F 1/29 |

FOREIGN PATENT DOCUMENTS

| | | | | |
|---|---|---|---|---|
| JP | 2018173665 A | 11/2018 | | |
| WO | WO-2021118111 A1 * | 6/2021 | | G06N 3/08 |

\* cited by examiner

IMAGE FORMING APPARATUS STORING SCAN DATA IN EXTERNAL MEMORY NON-TRANSITORY RECORDING MEDIUM STORING CONTROL PROGRAM, AND CONTROL METHOD

BACKGROUND OF THE DISCLOSURE

Field of the Disclosure

The aspect of the embodiments relates to an image pickup apparatus, an aberration correction method, and a program.

Description of the Related Art

Hitherto, there has been known a technology of correcting an error caused in focus detection or photometry by a change with time of an interchangeable lens. For example, in Japanese Patent Application Laid-Open No. H06-110115, there is disclosed a technology of readjusting an error in focus detection or photometry caused by a change with time.

However, in the related art disclosed in Japanese Patent Application Laid-Open No. H06-110115, an error related to focus detection can be corrected, but aberrations cannot be corrected.

SUMMARY OF THE DISCLOSURE

According to the aspect of the embodiments, an apparatus comprising: a system including a correction lens unit configured to move to correct an aberration; a driving device configured to move the correction lens unit; a pickup element configured to pick up an image formed by the system; an obtaining device configured to obtain an aberration based on a picked up image, through use of a learned model obtained by learning an image and aberration data of the system; and a controller configured to control the driving device based on the aberration, to thereby correct the aberration.

Further features of the disclosure will become apparent from the following description of exemplary embodiments with reference to the attached drawings.

DESCRIPTION OF THE EMBODIMENTS

Embodiment

Figure 1:
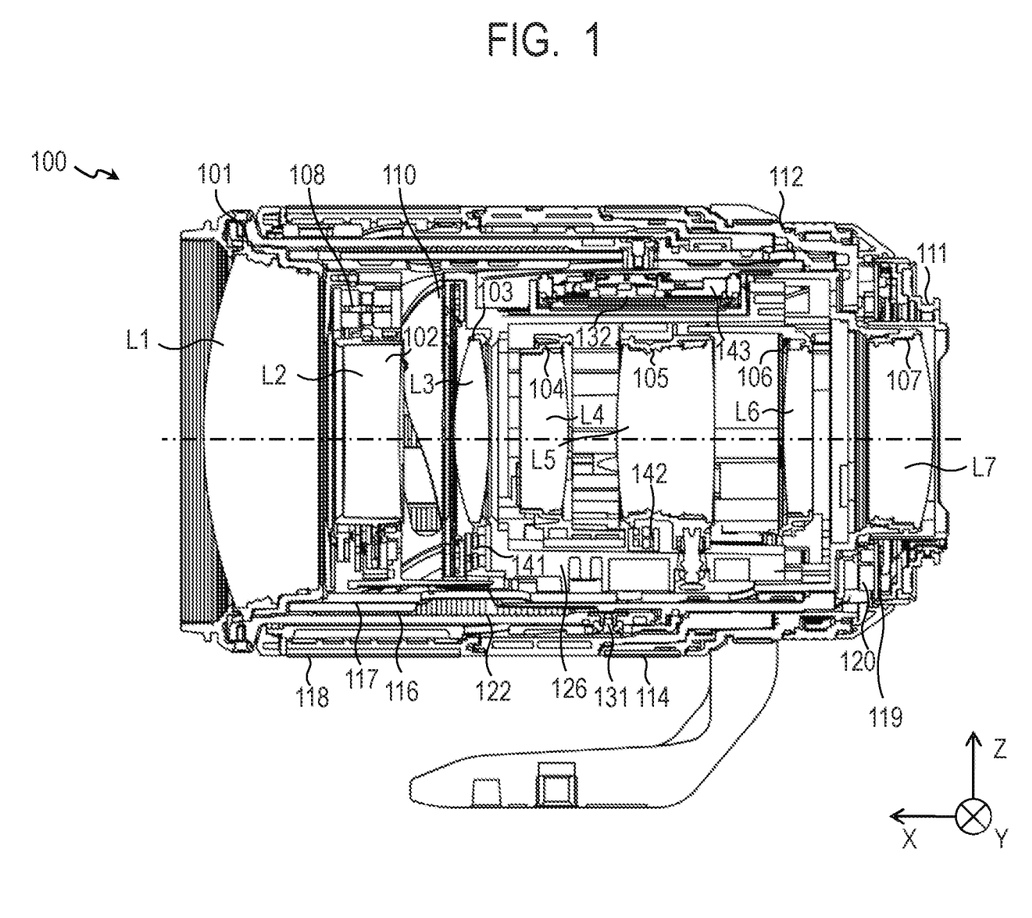
FIG. 1 is a sectional view at a wide angle end of an interchangeable lens in an embodiment.

Hereinafter, with reference to FIG. 1 to FIG. 4, an aberration correction method and an image pickup apparatus according to an embodiment of the disclosure are described.
Configuration
1. Configuration of Image Pickup Apparatus
First, with reference to FIG. 1, a configuration of an interchangeable lens 100 (interchangeable lens for a single-lens reflex camera) being a lens barrel in the embodiment of the disclosure is described. FIG. 1 is a sectional view taken along a plane that is parallel to an optical axis (X direction of FIG. 1) at a wide angle end of the interchangeable lens 100 in this embodiment.

The interchangeable lens 100 serving as an image pickup apparatus of this embodiment is a lens apparatus having a seven-unit configuration formed of a first lens unit L1 to a seventh lens unit L7. A focus lens unit corresponding to the sixth lens unit L6 and a floating lens unit corresponding to the fourth lens unit L4 are moved in an optical axis direction during a focusing operation (focus operation) in the interchangeable lens 100. Further, all of the lens units (first lens unit L1 to seventh lens unit L7) are moved in the optical axis direction along respective loci determined in advance, during a zooming operation (zoom or magnification-varying operation) in the interchangeable lens 100.

The interchangeable lens 100 is removably connected to a camera main body (not shown). The camera main body includes an image pickup element, such as a CCD or a CMOS, which receives an optical image formed by the interchangeable lens 100. The interchangeable lens 100 is configured to be mountable to and removable from the camera main body, and forms the image pickup apparatus through connection to the camera main body.

A lens mount 111 includes a bayonet portion for allowing the interchangeable lens 100 to be mounted to the camera main body, and is fixed to a fixed barrel 112 with screws. A guide barrel 116 is fixed to the fixed barrel 112 with screws.

The guide barrel 116 has formed therein a straight groove for guiding each lens unit in a straight direction. Further, the guide barrel 116 has a cam groove with which a third cam follower fixed to a cam barrel 117 with a screw is engaged. Thus, the cam barrel 117 is held so that the cam barrel 117 can be rotationally extended during zooming.

A zoom operation barrel 118 is held rotatably about the optical axis by being radially fitted and bayonet-engaged with the guide barrel 116. With the actions of a cam groove formed in the zoom operation barrel 118, a first cam follower 131 provided on an outer side of a straight-movable barrel 122, and the straight groove of the guide barrel 116, a rotational force of the zoom operation barrel 118 is converted into straight movement (movement in the optical axis direction) of the straight-movable barrel 122. Thus, the straight-movable barrel 122 moves straight during the zoom actuation.

A second cam follower 132 provided in the straight-movable barrel 122 is also engaged with a cam groove of the cam barrel 117, and the straight movement of the straight-movable barrel 122 is converted into rotational movement of the cam barrel 117. At this time, as described above, the cam barrel 117 is held so as to be rotationally extendable through engagement between the third cam follower fixed to the cam barrel 117 and the cam groove of the guide barrel 116. As a result, the straight movement of the straight-movable barrel 122 allows the cam barrel 117 to be rotationally extended with respect to the optical axis.

Next, through use of a force obtained when the cam barrel 117 is rotationally extended with respect to the guide barrel 116, and with the actions of a fourth cam follower and a fifth cam follower corresponding to each cam follower, straight grooves, and cam grooves, a rear lens unit and a seventh lens unit 107 can be driven in the optical axis direction.

As described above, there is obtained a basic configuration in which rotation of a zoom ring causes mechanical movement of each lens unit in this embodiment as follows:

1: straight extension of the straight-movable barrel 122;

2: rotational extension of the cam barrel 117; and

3: straight extension of each lens unit other than the first lens unit.

Next, each lens unit is described in detail.

A first unit 101 is a holding frame for holding the first lens unit L1. The first unit 101 is fixed to the straight-movable barrel 122 to be moved straight in the optical axis direction by means of the straight groove, the cam groove, and rollers.

At a distal end of the first unit 101, a bayonet portion for mounting a hood is formed on an outer peripheral side, and a thread is formed on an inner peripheral side so that an accessory, for example, a filter can be mounted.

A second unit 102 is a holding frame for holding the second lens unit L2. The second unit 102 forms a part of an image stabilizing unit 108. The image stabilizing unit 108 holds the second unit 102 in a manner that the second unit 102 can be driven in a direction orthogonal to the optical axis (optical axis orthogonal direction), and performs image stabilization by driving the second unit 102 by an image stabilizing driving device including a magnet and a coil. The image stabilizing unit 108 is held by means of a fixing unit (not shown) with respect to the guide barrel 116.

A third unit 103 is a holding frame for holding the third lens unit L3 (first correction lens unit). The third unit 103 forms a part of a first driving device 141. The first driving device 141 holds the third unit 103 in a manner that the third unit 103 can be driven in the direction orthogonal to the optical axis, and drives the third unit 103 by a driving device including a magnet and a coil. The first driving device 141 is fixed to a rear unit base 126, and is to be moved forward and backward in the optical axis direction by the fourth cam follower provided in the rear unit base 126 during the zoom operation.

Further, the first driving device 141 holds, at a base portion, an electromagnetic stop unit 110 including a stop driving device and a stop blade portion.

A fourth unit 104 is a holding frame for holding the fourth lens unit L4 (third correction lens unit) serving as the floating lens unit. The fourth unit 104 is guided to be moved straight by two guide bars held by the rear unit base 126. The fourth lens unit L4 is to be moved forward and backward in the optical axis direction by a third driving device 143 with respect to the rear unit base 126 which is driven in the optical axis direction during the zoom operation.

A fifth unit 105 is a holding frame for holding the fifth lens unit L5 (second correction lens unit). The fifth unit 105 forms a part of a second driving device 142. The second driving device 142 holds the fifth unit 105 in a manner that the fifth unit 105 can be driven in the direction orthogonal to the optical axis, and to drive the fifth unit 105 by a driving device including a magnet and a coil. The second driving device 142 is fixed to the rear unit base 126, and is to be moved forward and backward simultaneously with a motion of the rear unit base 126 being moved forward and backward in the optical axis direction during the zoom operation.

A sixth unit 106 is a holding frame for holding the sixth lens unit L6 (fourth correction lens unit) serving as a focus unit. The sixth unit 106 is guided to be moved straight by the two guide bars held by the rear unit base 126. The sixth lens unit L6 is to be moved forward and backward in the optical axis direction by a fourth driving device with respect to the rear unit base 126 which is driven in the optical axis direction during the zoom operation.

A seventh unit 107 is a holding frame for holding the seventh lens unit L7. The seventh unit 107 is to be moved forward and backward in the optical axis direction by the fifth cam follower during the zoom operation.

Information on the rotation of the zoom operation barrel 118 is detected by a zoom rotation detecting device (not shown), and is processed by a control device (controller) 119.

Information on the rotation of a focus operation barrel 114 is detected by a focus rotation detecting device (not shown), and is processed by the control device 119.

The control device 119 controls the entire interchangeable lens 100 including, for example, the first driving device 141 to the fourth driving device, the electromagnetic stop unit 110, and the image stabilizing unit 108.

Optical adjustment in the embodiment is described below. A coma and a one-sided defocus are adjusted through the movement of the third unit 103 and the fifth unit 105 in the direction orthogonal to the optical axis. Further, a curvature of field and a spherical aberration are adjusted through the movement of the fourth unit 104 and the sixth unit 106 in the optical axis direction. As described above, the positions of the third unit 103 and the fifth unit 105 are controlled by the first driving device and the second driving device, respectively. Accordingly, the third unit 103 and the fifth unit 105 are not always required to be controlled fixedly during zooming or focusing, and are held at positions at which best optical performance is obtained in each of a zoom state and a focus state. The same holds true also for the fourth unit 104 and the sixth unit 106.

2. Overall Processing Flow

Figure 2:
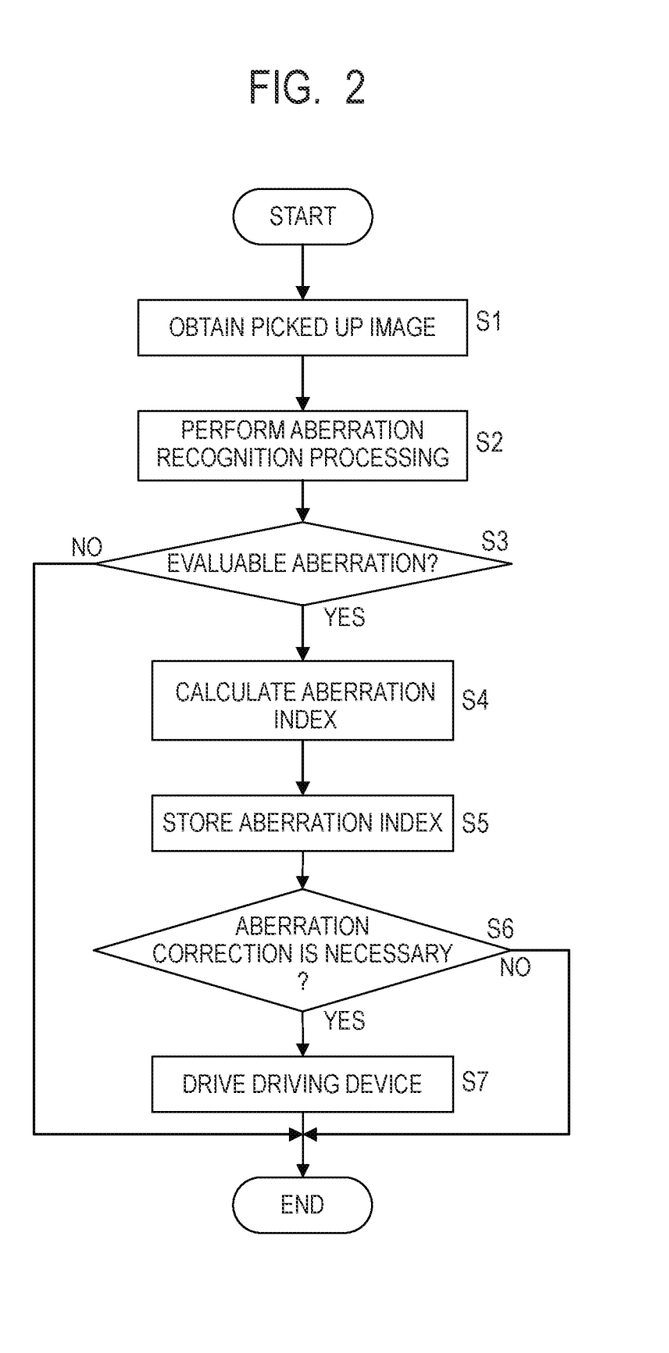
FIG. 2 is a processing flow of aberration correction in the embodiment.

With reference to FIG. 2, processing of an aberration correcting device (aberration obtaining device) 120 in this embodiment is described. The aberration correcting device 120 includes a determiner, a memory, a decider, and a storage which are to be described later.

In Step S1, a picked up image is obtained through use of the image pickup apparatus.

In Step S2, aberration recognition processing is performed with respect to the picked up image through use of a learned model.

In Step S3, the determiner determines whether or not an aberration is evaluable based on the result of the aberration recognition processing of Step S2. When the aberration is evaluable, the process proceeds to Step S4. When the aberration is not evaluable, the processing is ended.

In Step S4, an aberration index is calculated from aberration determination data. In the calculation of the aberration index here, an aberration amount is normalized in accordance with the type of the aberration.

In Step S5, the aberration index is stored in the memory (not shown). The aberration index is obtained every time an image is picked up (a shutter is released), and hence aberration indices are accumulated through repetitive image pickup.

In Step S6, through use of the aberration indices stored in the memory, it is determined whether or not the driving device (first, second, third, or fourth driving device) is required to be driven (whether or not aberration correction is necessary). When the aberration correction is necessary, the process proceeds to Step S7. When the correction is unnecessary, the processing is ended.

In Step S7, a drive amount of the driving device is determined based on the aberration index calculated in Step S4, and the control device operates the driving device based on the drive amount. A relationship between the aberration index and the drive amount of the driving device is stored in advance in the storage (not shown).

3. Aberration Recognition Processing

The aberration recognition processing of Step S2 performed by the aberration correcting device 120 in this embodiment is described.

First, the storage (not shown) is described.

In the aberration correcting device 120, the storage stores a learned model obtained by performing machine learning using, as training data, a training image being an image picked up through use of the interchangeable lens 100, and a type of an aberration included in the training image and a feature amount of the aberration (aberration data). In one embodiment, the training data include a photographing parameter at the time when the training image is obtained. The training image is an image obtained by picking up an image of an object in which an effect of an aberration can be easily distinguished when the aberration is caused. Examples of the training image include images obtained by picking up an image of a point light source, stars, leaves, branches, and the like.

Further, at a stage of creating the learned model, in one embodiment, the training data include a photographing condition and images picked up under conditions in which aberrations of various types and in various feature amounts are formed, because the type and the feature amount of the aberration can be specified at a higher accuracy. Further, at the stage of creating the learned model, in another embodiment, conceivable errors in design be appropriately are taken into account. The conceivable errors in design may be tolerances of lenses and components, or conceivable performance changes in design. As another example, an interchangeable lens 100 in which the drive amount of the driving device is changed so that an aberration is intentionally caused may be prepared in advance, and a picked up image picked up through use of this interchangeable lens 100 may be used as the training image.

As described above, there is used a learned model obtained by performing machine learning using, as the training data, the training image and the type of an aberration included in the training image and the feature amount of the aberration. In this manner, a picked up image can be obtained as input data, and whether or not an aberration is evaluable in this image can be obtained as output data. Further, when the aberration is evaluable, the type of the aberration and the feature amount thereof can be obtained as output data.

There may be prepared a plurality of learned models obtained by performing machine learning for respective conditions of image pickup parameters at the time when the training image is picked up, and a corresponding learned model may be applied to the picked up image classified depending on each condition of image pickup parameter so that the type of the aberration and the feature amount thereof are obtained as output data. As another example, there may be used a learned model obtained by performing machine learning using the training data including the image pickup parameter at the time when the training image is picked up so that the image pickup parameter is also included in the input data. Thus, the type of the aberration and the feature amount thereof may be obtained as output data with higher accuracy and more flexibility. The image pickup parameter is each specific value at the time when the training image is picked up. Examples of the image pickup parameter include image pickup date and time, a shutter speed, an aperture value, an ISO sensitivity, whether or not a flash is used, an exposure compensation value, a focal length, and a distance to an object (object distance, in a case of an image pickup apparatus including a time of flight sensor).

4. Determination on Whether or not Drive of Driving Device is Necessary

The processing flow of Step S6 of the control device 119 in the embodiment is described. In Step S5, the aberration index stored in the memory is called.

Figure 3:
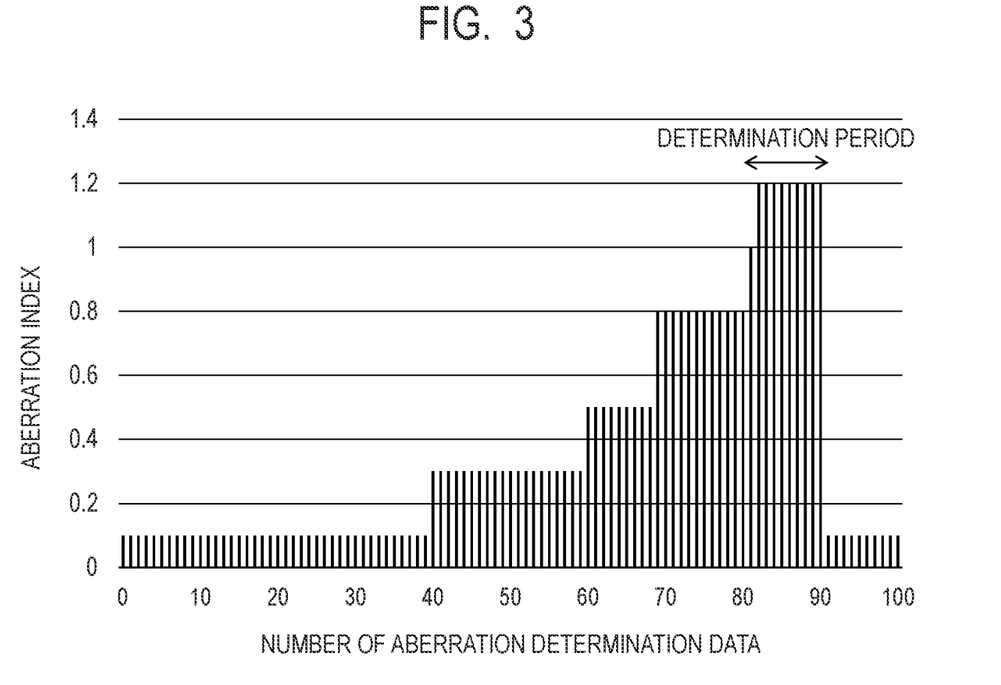
FIG. 3 is an explanatory graph for showing determination on whether or not aberration correction is necessary in the embodiment.

FIG. 3 shows an example of processing performed by the decider of the aberration correcting device 120. FIG. 3 shows the aberration index corresponding to the number of aberration determination data (proportional to the number of times of picking up images). As the aberration determination data is increased, the aberration index is also increased. This indicates that, as the number of times of picking up images of the image pickup apparatus is increased and the number of times of driving a movable portion of the interchangeable lens 100 is increased, the aberration of the interchangeable lens 100 is increased. Further, the reason why the aberration index is decreased at the time when the number of aberration determination data reaches 90 is because, as described later, the driving device is operated and thus the aberration is reduced.

A determination period shown in FIG. 3 corresponds to a range of data referred to in order to determine whether or not to operate the driving device in the processing of Step S6. In this embodiment, an actuation of the driving device is set as follows. Under a state in which a determination criterion is set to an aberration index of 1.0, an average value of ten pieces of latest data (first period, specific period) is obtained, and when the average value exceeds 1.0, the driving device is actuated.

5. Description of Effect of Operation at Time of Picking Up Image of Point Light Source as One Example With reference to FIG. 2, the operation of the driving device at the time when an object including a point light source is picked up as the picked up image, and an effect obtained thereby are described.

The image pickup conditions are as follows.
Image pickup date and time: 2019/11/26, 17:03
Shutter speed: 1/320 (sec)
Aperture value: F1.8
ISO sensitivity: ISO 100
Whether or not a flash is used: no
Exposure compensation value: 0
Focal length: 50 mm First, in Step S1, the picked up image is obtained.

In Step S2, the learned model stored in the storage is used so that, with respect to the picked up image being the input data, aberration determination information is obtained as the output data. In this case, the aberration determination information refers to information on whether or not an aberration is quantitatively evaluable through application of the learned model to the picked up image, and information including, when the aberration is evaluable, the type of the aberration and the feature amount thereof. Based on this aberration determination information obtained through application of the learned model, a coma can be detected as an example of the aberration, and a shape and dimension of the coma can be determined.

In Step S3, based on the aberration determination information obtained in Step S2, when the aberration is evaluable, the process proceeds to Step S4, and when the aberration is not evaluable, the processing is ended.

In Step S4, for example, in a case of a coma, a length of a tail of the coma is set as the feature amount. The feature amount is calculated as the aberration index through normalization with an allowable limit being set as 1.0. It is known that a point light source causing a coma causes image smearing or blurring as leaving a tail. In a case of an astigmatism, a minor-axis length and a major-axis length of an elliptical image with respect to the point light source can be set as the aberration index.

In Step S5, the aberration index obtained in Step S4 is stored in the memory. The aberration indices obtained by a plurality of times of picking up images are stored so that reliability of the determination made in Step S6 to be described later is improved. It is considered that, through use of an optical chart for aberration determination used by specialists, reliable determination can be made from one picked up image. However, specialized knowledges or special facilities are required, and hence the optical chart is inconvenient for general users. In view of the above, the aspect of embodiments has a feature in that, as the result of the aberration recognition processing, the aberration index is calculated from a picked up image generally picked up through normal picking up of image, instead of picking up image of a special object, for example, the optical chart prepared for aberration evaluation.

With reference to FIG. 3, the processing of Step S6 is described.

FIG. 3 shows the aberration index (vertical axis) with respect to the number of aberration determination data (horizontal axis). It is understood that the aberration index is increased as the number of aberration determination data is increased. This is because the aberration is increased as the number of times of picking up of image of the interchangeable lens 100 is increased.

The determination period shown in FIG. 3 corresponds to a range of data of aberration indices referred to in order to determine whether or not to operate the driving device in the processing of Step S6. A determination criterion threshold value is set to an aberration index of 1.0, and hence at a time point at which the average value of ten latest data exceeds 1.0, it is determined that the actuation of the driving device (aberration correction) is necessary. In the example of FIG. 3, the aberration index exceeds 1.0 finally when the number of aberration determination data reaches 90, and hence it is determined that the driving device is required to be operated. In Step S6, as described above, determination on whether or not to actuate the driving device is made based on the average value of a plurality of data. Accordingly, there can be performed highly reliable determination in which an effect of variations of obtained aberration indices due to a measurement error or the like is reduced.

In Step S7, the drive amount of the driving device is determined based on the aberration index received in Step S6, and an instruction on the drive amount is issued to the control device 119.

As described above, the technology of the aspect of the embodiments resides in that an aberration is automatically or actively corrected through use of a picked up image picked up by a user as an input value. An aberration caused by a change with time or an unexpectedly caused aberration are also automatically corrected. The user is not required to perform a special operation, and an image picked up during normal use is used as a target for which an aberration occurrence state is determined. Thus, the convenience is high. High performance can be maintained over a long period even after the image pickup apparatus falls into the hands of the user from the manufacturer of the image pickup apparatus. The execution of the aberration recognition processing and the obtaining of the aberration index may be performed every time the shutter is released, or may be performed for each predetermined number of times of shutter release (for each predetermined number of times of image pickup). The predetermined number of times of image pickup can be set as appropriate in consideration of a state of the apparatus, an image pickup condition, an environmental condition, and the like. In any case, the aberration is evaluated during normal use of the image pickup apparatus without the user being conscious of the aberration correction, and a correction optical system is moved as required based on the exemplified processing flow so that the aberration is corrected.

6. Method of Improving Performance of Determination

Typical examples of a method of improving an accuracy of the technology according to the aspect of the embodiments are described.

Figure 4:
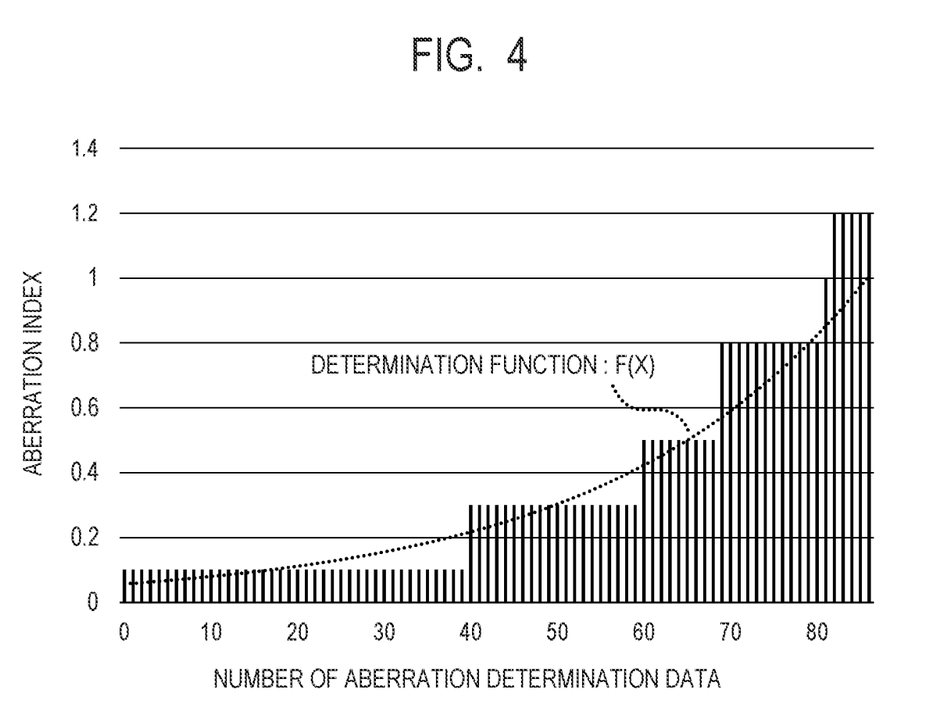
FIG. 4 is an explanatory graph for showing determination on whether or not aberration correction is necessary in another embodiment.

As a first method, with reference to FIG. 4, Step S6b different from Step S6 is described. Step S6b differs from Step S6 in the determination period and the method of calculating the aberration index during the period. In Step S6b, the determination period is set as an entire period after the previous drive of the correction lens unit (after the previous aberration correction), and all aberration determination data in the entire period are used. The aberration indices in the entire period are approximated by an approximation expression of a determination function F(x) (x: number of aberration determination data), and it is determined that the drive of the driving device is necessary at a time point at which a value of the determination function F(x) exceeds 1.0. In this embodiment, since "determination function F(90)>1.0" is satisfied, it is determined that the driving device is required to be operated.

The determination period is set as the entire period, but the determination period may be dynamically determined. For example, when an acceleration sensor included in the image pickup apparatus detects a large acceleration, it can be expected that the aberration index is greatly changed. Thus, the determination period may be started from when the aberration index is greatly changed.

As a second method, Step S6c different from Step S6 is described. In Step S6c, determination is made through use of a plurality of aberration indices. For example, when a plurality of types of aberrations are caused, a method of operating the driving device may be determined so as to minimize the plurality of aberration indices based on a predetermined evaluation method. In this case, the predetermined evaluation method may be, for example, an evaluation method in which weighting is performed so that a larger evaluation value is given to an aberration as the aberration is required to be reduced, which is determined based on the image pickup condition. As another example, each of the types of aberrations may be individually evaluated, and each aberration index may be evaluated with respect to a threshold value set for each type of aberration.

As a third method, Step S6d different from Step S6 is described. In Step S6d, the aberration index to be used for determination is limited depending on the image pickup condition. For example, aberrations such as a spherical aberration, a coma, and an astigmatism are most greatly caused when the aperture value is the minimum. Accordingly, when an aberration index limited to the case in which the aperture value is the minimum is selectively used for evaluation, the accuracy of the processing of Step S6d can be improved. The image pickup parameter is not limited to the aperture value, and when evaluation is performed with respect to a population limited by an image pickup parameter which is liable to cause a great aberration, for example, a focal length or a color of the light source, the accuracy of the aberration correction can be further improved.

As a fourth method, when determination is made based on aberration indices obtained by picking up an image of different similar objects, overcorrection which may occur when the object has a shape of an aberration by any chance can be prevented.

As a fifth method, when the picked up image is obtained in Step S1, it is also effective to perform focus bracketing so that picking up an image is performed by changing a focus position (focus distance), thereby increasing the number of data input to the aberration recognition processing of Step S2.

As a sixth method, Step S6e different from Step S6 is described. In Step S6e, in consideration of also a determination criterion other than the aberration index threshold value, the timing to operate the driving device in Step S7 is adjusted. When the driving device is operated during photographing and the aberration is eliminated, there may be a feeling of strangeness when continuously picking up images are looked at. Accordingly, the process proceeds to Step S7 in consideration of an index other than the aberration index, for example, performing correction, after the continuous photographing is finished.

As a seventh method, when the picked up image is obtained in Step S1, it is also effective to pick up the image by intentionally changing the focal length, thereby increasing the number of data input to the aberration recognition processing of Step S2. Through such picking up image, a plurality of picked up images obtained by a plurality of times of picking up images in which the image pick up condition is changed by minute steps can be used as the input data supplied to the aberration recognition processing of Step S2. Thus, the reliability of the aberration index can be further enhanced.

In this embodiment, the first and second driving devices are configured to allow movement in the direction orthogonal to the optical axis, but the disclosure is not limited thereto. For example, there may be employed a correction lens unit having a configuration capable of tilting its optical axis with respect to the optical axis of the lens apparatus, or there may be employed a configuration in which drive is allowed in a combination thereof. As another example, there may be employed a configuration in which one driving device is used. The number of correction optical systems, the driving method, the driving direction, and the like can be selected as appropriate in order for the optical system to correct the aberration.

In this embodiment, the first to fourth driving devices form units for correcting a coma, a one-sided defocus, a curvature of field, and a spherical aberration, but it is not always required to provide all of those configurations. There may be employed a configuration in which one aberration is corrected by a single driving device. For example, in a case of an optical system in which a change of a coma is extremely small when each lens unit is varied, a unit for adjusting the coma is not required to be provided.

In this embodiment, the image stabilizing unit 108 is provided in addition to the first and second driving devices as a driving device for allowing movement in the direction orthogonal to the optical axis, but the image stabilizing unit 108 may be used for aberration correction. When the image stabilizing unit 108 is used for aberration correction, it is appropriate to employ a method of offsetting a drive center position of the second unit 102 to be driven by the image stabilizing unit 108, and driving the second unit 102 for image stabilization about the offset position.

In this embodiment, the aberration correcting device 120 is included in the interchangeable lens 100, but the aberration correcting device 120 may be included in the camera main body. Further, a part of the aberration correcting device 120 may be included in the camera main body. For example, the determiner may be included in the camera main body, and the memory, the decider, and the storage may be included in the interchangeable lens 100. Still further, there is described a configuration in which the camera main body and the interchangeable lens 100 in this embodiment are mountable to and removable from each other, but a configuration in which the camera main body and the interchangeable lens 100 are integrally formed may be employed.

In this embodiment, the aberration correcting device 120 uses image recognition that uses machine learning, but the disclosure is not limited thereto. A deep learning technology may be used.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The processor or the circuit may include a central processing unit (CPU), a micro processing unit (MPU), a graphics processing unit (GPU), an application specific integrated circuit (ASIC), or a field programmable gate array (FPGA). Further, the processor or the circuit may include a digital signal processor (DSP), a data flow processor (DFP), or a neural processing unit (NPU).

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-170990, filed Oct. 9, 2020, which is hereby incorporated by reference herein in its entirety.

What is claimed is:
1. An apparatus comprising:
a system including a correction lens unit configured to move to correct an aberration;

a driving device configured to move the correction lens unit;

a pickup element configured to pick up an image formed by the system;

at least one processor;

a memory coupled to the at least one processor storing instructions that, when executed by the at least one processor, cause the at least one processor to function as:

an obtaining device configured to obtain an aberration based on a picked up image, through use of a learned model obtained by learning an image and aberration data of the system; and a controller configured to control the driving device based on the aberration, to thereby correct the aberration, wherein the correction lens unit corrects the aberration by moving a floating lens unit that is moved for focusing or by moving a lens unit that is not moved for focusing.

2. The apparatus according to claim 1, wherein the learned model is obtained by learning the aberration data and information related to an image and a pickup condition, and wherein the obtaining device is configured to obtain, through use of the learned model, the aberration based on the information related to the picked up image and the pickup condition.

3. The apparatus according to claim 1, further comprising a memory configured to store the obtained aberration, wherein the controller is configured to determine a drive amount of the correction lens unit based on the aberration stored in the memory.

4. The apparatus according to claim 3, wherein the controller is configured to determine the drive amount based on a plurality of aberrations stored in the memory.

5. The apparatus according to claim 4, wherein the controller is configured to determine the drive amount based on an average value of the plurality of aberrations during a specific period, which are stored in the memory.

6. The apparatus according to claim 4, wherein the controller is configured to determine the drive amount based on all of the plurality of aberrations stored in the memory after previous driving of the correction lens unit.

7. The apparatus according to claim 6, wherein the controller is configured to determine the drive amount based on an approximation expression of all of the plurality of aberrations after previous driving of the correction lens unit.

8. The apparatus according to claim 3, wherein the obtaining device is configured to obtain a plurality of types of aberrations through use of the learned model, and wherein the controller is configured to determine the drive amount based on the plurality of types of aberrations.

9. The apparatus according to claim 2, wherein the aberration is obtained through use of the learned model based on at least one of a shutter speed, an aperture value, an ISO sensitivity, a focal length, an object distance, or exposure compensation, and on the picked up image.

10. The apparatus according to claim 2, wherein the learned model is trained while being classified depending on the pickup condition.

11. The apparatus according to claim 1, wherein a timing at which the controller controls the driving device to correct an aberration and a timing at which the obtaining device determines the aberration are different from each other.

12. The apparatus according to claim 3, wherein the obtaining device is configured to obtain an aberration through use of the learned model every time the image is picked up, and to store the aberration in the memory.

13. The apparatus according to claim 3, wherein the obtaining device is configured to obtain an aberration through use of the learned model for each predetermined number of times of image pickup, and to store the aberration in the memory.

14. A method comprising:

obtaining an aberration based on a picked up image through use of a learned model obtained by learning a picked up image and aberration data of the picked up image;

determining, based on the aberration, a drive amount for driving a system, including a floating lens unit that is moved for focusing or a lens unit that is not moved for focusing, in order to correct the aberration; and controlling driving of the system based on the drive amount to correct the aberration.

15. The method according to claim 14, wherein the learned model is obtained by learning the aberration data and information related to an image and a pickup condition, and wherein the obtaining obtains, though use of the learned model, the aberration based on the information related to the picked up image and the pickup condition.

16. The method according to claim 14, wherein a timing at which the controlling controls the driving to correct an aberration and a timing at which the obtaining determines the aberration are different from each other.

17. A computer-readable storage medium storing a program for causing a computer to execute a method, the method comprising:

obtaining an aberration based on a picked up image through use of a learned model obtained by learning a picked up image and aberration data of the picked up image;

determining, based on the aberration, a drive amount for driving a system, including a floating lens unit that is moved for focusing or a lens unit that is not moved for focusing, in order to correct the aberration; and controlling driving of the system based on the drive amount to correct the aberration.

18. The computer-readable storage medium according to claim 17, wherein the learned model is obtained by learning the aberration data and information related to an image and a pickup condition, and wherein the obtaining obtains, though use of the learned model, the aberration based on the information related to the picked up image and the pickup condition.

19. The computer-readable storage medium according to claim 17, wherein a timing at which the controlling controls the driving to correct an aberration and a timing at which the obtaining determines the aberration are different from each other.

20. An apparatus comprising:

a system including a correction lens unit configured to move to correct an aberration;

a driving device configured to move the correction lens unit;

at least one processor;

a memory coupled to the at least one processor storing instructions that, when executed by the at least one processor, cause the at least one processor to function as:

an obtaining device configured to obtain an aberration based on an image that is formed by the system and is picked up by a pickup element, through use of a learned model obtained by learning an image and aberration data of the system; and a controller configured to control the driving device based on the aberration, to thereby correct the aberration, wherein the correction lens unit corrects the aberration by moving a floating lens unit that is moved for focusing or by moving a lens unit that is not moved for focusing.

* * * * *